Apr. 3, 1923.                                                1,450,252
               B. H. DAULTON ET AL
       MECHANISM FOR MANUFACTURE OF AUGER BITS
              Filed Feb. 7, 1921          2 sheets-sheet 2
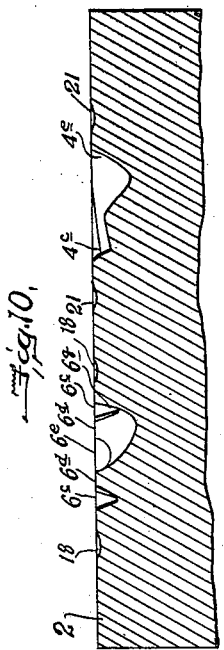
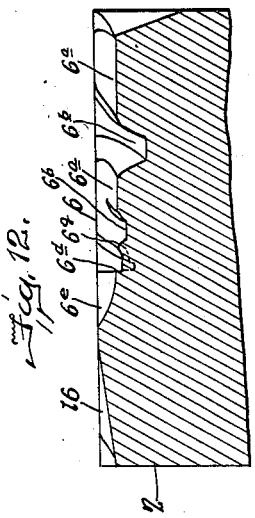
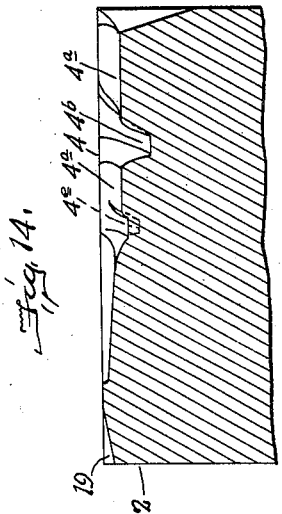
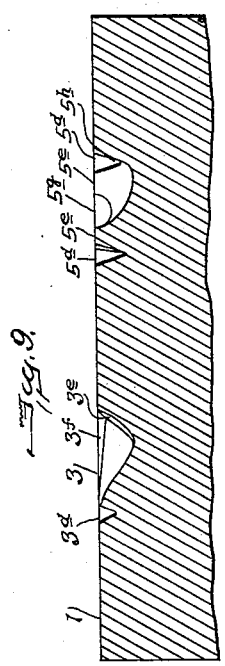
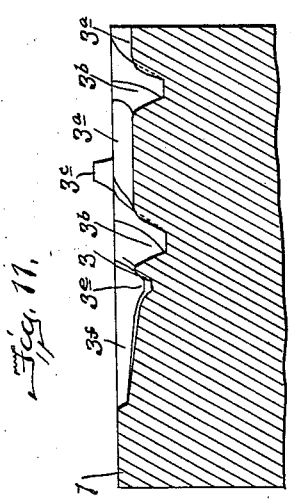
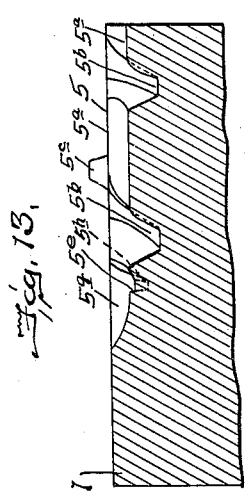
INVENTORS
BENJAMIN H. DAULTON,
CHARLES B. ROBINSON,
ATTORNEYS.

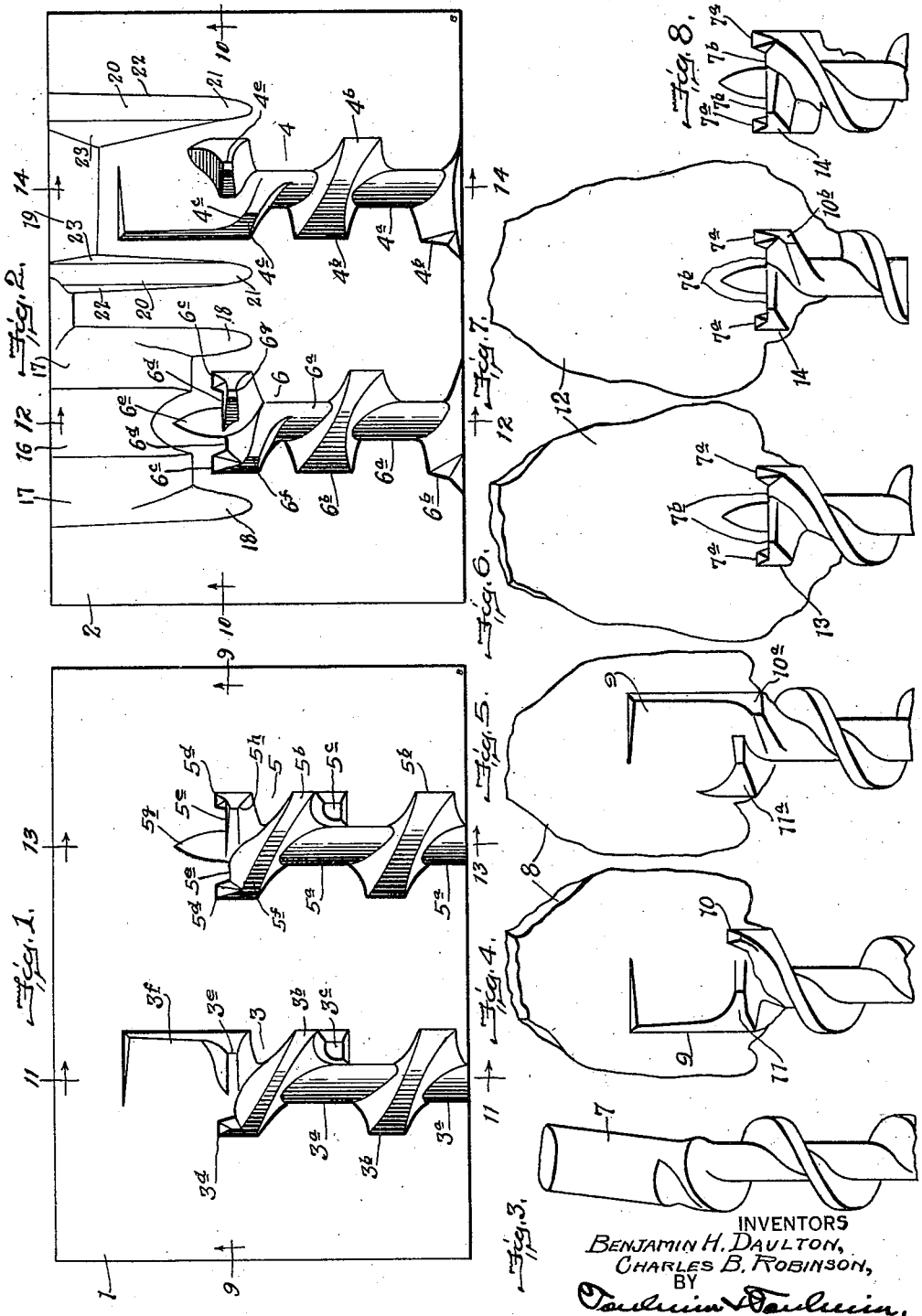

Patented Apr. 3, 1923.

1,450,252

UNITED STATES PATENT OFFICE.

BENJAMIN H. DAULTON AND CHARLES B. ROBINSON, OF WILMINGTON, OHIO, ASSIGNORS TO THE IRWIN AUGER BIT COMPANY, OF WILMINGTON, OHIO, A CORPORATION OF OHIO.

MECHANISM FOR MANUFACTURE OF AUGER BITS.

Application filed February 7, 1921. Serial No. 442,899.

*To all whom it may concern:*

Be it known that we, BENJAMIN H. DAULTON and CHARLES B. ROBINSON, citizens of the United States, residing at Wilmington, in the county of Clinton and State of Ohio, have invented certain new and useful Improvements in Mechanism for Manufacture of Auger Bits, of which the following is a specification, reference being had therein to the accompanying drawing.

This invention relates to an improved mechanism for the manufacture of auger bits, and consists, essentially, of a pair of die members constructed with certain novel features pertaining to the die cavities by which the resulting bit or product derived from these die members will have forward-projecting cutting spurs, as distinguished from a bit in which these spurs are absent, as for instance, the bit shown in the co-pending application of one of us, namely, Benjamin H. Daulton, filed Feby. 7th, 1921, Ser. No. 442,898, now Patent No. 1,420,527, dated June 20th, 1922.

The die cavities in our present invention further differ from the dies in the application just referred to in the provision of a different and more pronounced die recess for the formation of a so called "pyramid" to form the "short side" of the auger, as will hereinafter be more fully explained in detail.

In the accompanying drawings,

Fig. 1 is a plan view of one die member containing the first and second die cavities, the first cavity being used in the first die treatment of the raw stock and the second die cavity in the second treatment of the stock;

Fig. 2 is a like view of the other die member with the corresponding die cavities;

Fig. 3 is a view of a portion of the raw stock in the form to which it is reduced when made ready for treatment by our dies;

Fig. 4 is a view of the stock after the first die treatment showing the side treated by the lower die;

Fig. 5 is also a view of the stock after the first die treatment showing the side treated by the upper die;

Fig. 6 is a view of the stock after the second die treatment showing the side treated by the lower die;

Fig. 7 is a like view of the stock after the second die treatment showing the side treated by the upper die;

Fig. 8 is a view of the product shown in Figs. 6 and 7 after the surplus web has been sheared off;

Fig. 9 is a sectional view of one of the die members on the line 9—9 of Fig. 1;

Fig. 10 is a sectional view of the other die member on the line 10—10 of Fig. 2;

Fig. 11 is a sectional view on the line 11—11 of the die member shown in Fig. 1;

Fig. 12 is a sectional view on the line 12—12 of the die member shown in Fig. 2;

Fig. 13 is a sectional view on the line 13—13 of the die member shown in Fig. 1; and Fig. 14 is a sectional view on the line 14—14 of the die member shown in Fig. 2.

In the drawings numeral 1 designates what for convenience we will call the first or lower die member and the numeral 2 the second or upper die member. The die cavities generally shown at 3 cooperate with those generally shown at 4 and the die cavities generally indicated by 5 cooperate with those so indicated by 6.

Specifically, the die cavities 3 comprise recesses 3$^a$ for the core of the bit; recesses 3$^b$ for the spiral; studs 3$^c$ which cooperate in sustaining the blank in place; a recess 3$^d$ for forming one of the spurs or cutting points; a recess 3$^e$ for forming one part of the "short side;" and a large flat recess 3$^f$ for receiving some of the surplus material contained in the bar 7 of the blank stock shown in Fig. 3, the balance of the surplus overflowing the recess 3$^f$ onto the face of the die and leaving a fin or web 8 in addition to the plate-like part 9 formed in the recess 3$^f$ and shown in Fig. 4. We would lay particular emphasis upon the recess 3$^d$ in which a portion of the cutting spur is formed, as shown at 10 in Fig. 4, this projection 10 being the product of such recess 3$^d$.

Then the recess 3$^e$ forms the "pyramid" 11 shown in Fig. 4, which "pyramid" ultimately becomes a part of the "short side," as seen in Figs. 5 and 6.

It will now be understood that when the raw stock shown in Fig. 3 is placed in the recesses generally shown at 3 in Fig. 1 and the die 2 is brought down upon the stock so that by a blow or pressure it will enter in the recesses generally shown at 4, the stock will be converted from what is shown in Fig. 3 to what is shown in Figs. 4 and 5, the recesses generally shown at 3 forming what appears in Fig. 4 and recesses generally shown at 4 forming what is shown in Fig. 5, the spur 10 and the "pyramid" 11 being with the surplus material 9 the essential product of the recesses in the group 3 and the portion 10$^a$ and the pyramid 11$^a$ being formed by the recesses 4$^b$ and 4$^c$, respectively, presently to be described.

Referring now to the die recesses shown generally at 4 in Fig. 2, it will be seen that at 4$^a$ there is a recess for the core of the bit; at 4$^b$ a recess for the spirals; at 4$^c$ a recess for forming the portion 10$^a$, as before stated, which portion ultimately enters into a part of the "short side;" and at 4$^e$ a recess which forms the "pyramid" 11$^a$, as before stated, and which "pyramid" ultimately forms the termination of the spiral.

So much for the treatment of the raw stock in the first operation, in which the die recesses 3 and 4 are used.

Turning now to the die recesses generally shown at 5 and 6, it is to be understood that the stock in the condition shown in Figs. 4 and 5 is converted by the cooperation of these recesses 5 and 6, in the second die operation, into the state shown in Fig. 6, after which the fin 12 is sheared off to leave the product shown in Fig. 8, which is finished by resort to a milling operation.

The peculiarities of the recesses 5 are these. Cavities 5$^a$ for the core of the bit, 5$^b$ for the spiral with a stud 5$^c$ to coact in more readily holding the bit in place, as does the stud 3$^c$; and in recesses 5$^d$ and prongs 5$^e$ for forming the cutting spurs 7$^a$ (in cooperation with the recesses and spurs 6$^c$ and 6$^d$ presently to be described), which project forwardly of the cutting edges 7$^b$; (see Figs. 6, 7 and 8), while intermediate of the prongs 5$^e$ is a recess 5$^g$ which forms one-half of the auger point which is ultimately screw-threaded to make it take into the wood when boring.

Then the coacting recesses generally designated 6 comprise specifically the parts 6$^a$ for the core; 6$^b$ for the spirals; recesses 6$^c$ and prongs 6$^d$ for forming the cutting spurs; a recess 6$^e$ for forming a part of the auger point and a recess 6$^f$ for finishing off the portion 10$^a$ (see Fig. 5), to constitute one part, 10$^b$, of the "short side" (see Fig. 7), the other part of the "short side" coming from the recess 5$^h$ and being shown at 13 in Fig. 6; and finally, a recess 6$^g$ which produces the extreme termination 14 of the spiral, the remainder of the termination of the spiral coming out of the recess 5$^f$ appearing in Fig. 1.

To provide means for the escape of the surplus material the die 2 is constructed with a sloping surface 16 convex on the upper face and sloping to large slanting depressions 17 which extend inwardly in the form of shallow grooves 18. These features are associated with the die recesses generally designated at 6.

The die recesses generally designated 4 have somewhat similar features for receiving the surplus material, namely, a sloping surface 19 with concave depressions 20 at either side extending inwardly, as shown at 21, and bordered with slightly inclined surfaces 22—23.

Thus it will be seen that by our improved dies we produce the "short side" of the bit, the termination of the spiral side, the cutting edges and the cutting spurs, as well as the extreme point; and that we do this from a bar of raw stock, eliminating by our dies and the shearing operations used in connection therewith the old objectionable upsetting or longitudinal compression of the material.

Our dies have been used in commercial practice and found to be effective and satisfactory.

Having thus fully described our invention, what we claim as new and desire to secure by Letters Patent, is:—

1. In a die for the production of auger bits, the combination, with one die member having core and spiral recesses, a spur recess at one side of the center and a pyramid recess at the other side, and a recess for surplus material, of a second die member having core and spiral recesses and spur and pyramid recesses, and a surplus material recess, the said recesses adapted to coact with the similar recesses in the other die member.

2. In a die for the production of auger bits, the combination, of one die member having core and spiral recesses, a spur recess at one side of the center and a combined pyramid and spur recesses at the other side, and a point recess, with another die member having core and spiral recesses, a spur recess at one side of the center and a combined pyramid and spur recess at the other, and a point recess, adapted to coact with the corresponding recesses in the other die member.

3. In a die for the production of auger bits, the combination, of one die member having two sets of recesses; each set comprising core and spiral recesses, and one set spur, pyramid and surplus material recesses and the other set a spur recess, a combined pyramid and spur recess, and a point recess, with another die member having two sets of die recesses each having a core recess and a spiral recess, and one set having a spur recess and a pyramid recess, and the other set having a spur recess, a combined pyramid and spur recess, and a point recess, one set of recesses on each die member adapted to coact with the corresponding recesses on the other die member.

4. In a die for the production of auger bits, a die block having forming recesses comprising a core recess, spiral recesses, a spur recess at the end of one spiral recess, a pyramid recess at the end of the other spiral recess and a surplus material recess to receive the overflow metal adjacent to these latter recesses.

5. In a die for the production of auger bits, a die member having forming recesses comprising a core recess, spiral recesses, a spur recess at the end of one spiral recess, a combined pyramid and spur recess at the end of the other spiral recess, and a point recess intermediate the spur recesses.

6. In a die for the production of auger bits, a die member having forming recesses comprising a core recess, spiral recesses, a combined spur and short side recess, an opposite combined spur and pyramid recess, and an intermdiate point recess.

7. In a die for the production of auger bits, a die member having forming recesses comprising a core and spiral recesses, a short side pyramid recess at one side of the core end and an opposite pyramid recess at the other side of said core end, and an adjacent recess for the surplus material.

In testimony whereof, we affix our signatures.

BENJAMIN H. DAULTON.
CHARLES B. ROBINSON.